Feb. 27, 1951   J. L. STARK   2,543,609
MERCHANDISE ORDER INDICATOR
Filed Oct. 26, 1948
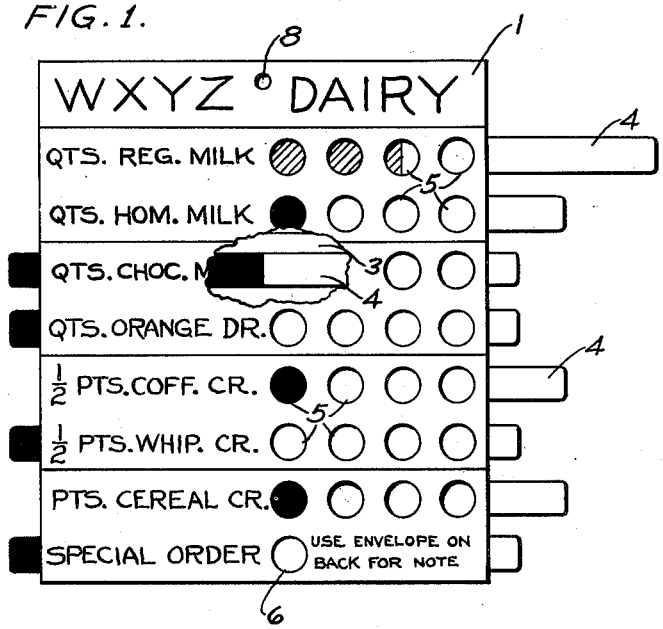
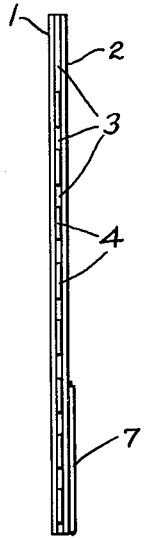
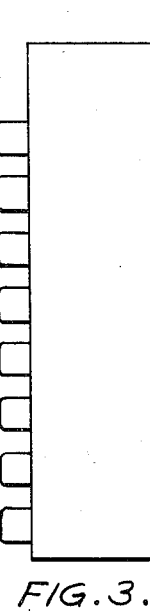
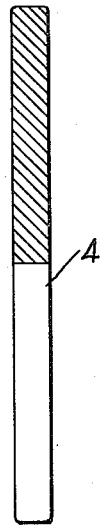
INVENTOR.
John L. Stark
BY
FISHER & CHRISTEN
ATTORNEYS

Patented Feb. 27, 1951

2,543,609

UNITED STATES PATENT OFFICE 2,543,609

MERCHANDISE ORDER INDICATOR

John L. Stark, Cedar Rapids, Iowa

Application October 26, 1948, Serial No. 56,609

1 Claim. (Cl. 116—135)

This invention relates to devices for indicating merchandise to be left by a delivery man on his regular call.

It is a general object of my invention to provide a simple indicating device which will inform the delivery man of a number of items in various quantities which the customer is desirous of purchasing.

It is a further object of my invention to provide an indicating device employing a system whereby the delivery man can determine the items and quantities desired from his delivery vehicle, thereby saving him the extra trip to the recipient's establishment usually necessary to determine what is required.

It is still another object of my invention to provide an indicating device employing color and symbols to indicate quantity instead of numerals which would be difficult to interpret at a distance.

It will be apparent upon consideration of the accompanying drawing and following specification, wherein is disclosed a single exemplary embodiment of the invention, that changes may be made therein, particularly to adapt the invention for use by various merchandisers to suit needs peculiar to their specific product without departing from the spirit of the invention.

Referring now to the accompanying drawings:

Figure 1 is a front elevation of an indicating device illustrating the preferred embodiment of my invention, broken away in part to show an indicating slide in normal operating position.

Figure 2 is a side elevation showing construction details of the device.

Figure 3 is a rear elevation showing envelope attached on the back.

Figure 4 is a view of one surface of one of the sliding members when it is not assembled.

Figure 5 is a view of the other surface of one of the sliding members.

Referring now to the drawing in which like reference numerals refer to like parts; a front plate 1 and back plate 2 are spaced apart by thin strips 3 arranged to provide guiding channels for sliding members 4. Front plate 1, back plate 2 and spacer strips 3 are secured in proper respect to each other by cementing or riveting, the members being preferably composed of a thin, stiff, water repellant material. Sliding members 4 are long enough to extend beyond the guiding parts enabling them to be grasped for easy movement.

Appearing on front plate 1 is a list of commodities with a plurality of openings 5 adjacent to each individual commodity. Sliding members 4 have a portion of their surface the same color as the surface of front plate 1, and other portions of their surfaces are colored or decorated to contrast sharply with the color of the front plate 1. Movement of sliding member 4 will bring the sharply contrasting color into view through any desired number of openings 5 thereby indicating the quantity of any of the listed commodities to be delivered.

Sliding members 4 are colored or decorated differently on their opposite sides, one color indicating that a double order is desired thereby increasing the quantity of a commodity that can be ordered to double the number of openings 5.

Similarly, attention can be called to an uncommon commodity desired, by use of a single opening 6 in front plate 1 which is adjacent to instructions on how to proceed. An envelope 7 is secured to the back plate 2 for holding written instructions or payments.

A small hole 8 is centrally located near the top edge of the indicator for purposes of hanging the indicator in a place easily seen by the delivery man.

I claim as my invention:

A merchandise order indicator comprising a sheet of material provided with a plurality of groups of spaced openings in horizontal alignment extending along one side of said sheet, said sheet also being provided with a printed list of commodities on one face adjacent said openings extending along the opposite side of said sheet, said groups of openings and said printed commodity list each covering substantially one-half the horizontal space of said sheet, flat rectangular slidable members arranged behind and supported by said sheet adjacent said openings and in horizontal alignment therewith, for displaying color in contrast to said sheet through said openings whereby an indication is given as to the amount of each commodity desired by the consumer depending upon the number of openings displaying color contrast with respect to said sheet, said members extending beyond the edges of said sheet in one position and each said member having substantially one-half its horizontal space in sharp color contrast to the opposite half, the half of each member disposed toward said groups of openings being substantially the same color as said sheet, horizontally disposed spacer strips attached to said sheet for supporting said slidable members adjacent the back of said sheet and adjacent said openings, a second sheet covering said spacer strips and holding said slidable members in operative relationship with said first sheet.

JOHN L. STARK.

REFERENCES CITED

The following references are of record in the file of this patent:

UNITED STATES PATENTS

| Number | Name | Date |
|---|---|---|
| 1,017,806 | Rodgers | Feb. 20, 1912 |
| 1,268,162 | Scalbom | June 4, 1918 |
| 1,672,389 | Mahon | June 5, 1928 |
| 2,187,327 | Novak et al. | Jan. 16, 1940 |
| 2,275,313 | Perenyi | Mar. 3, 1942 |

FOREIGN PATENTS

| Number | Country | Date |
|---|---|---|
| 567,362 | Germany | Dec. 31, 1932 |
| 840,645 | France | Jan. 23, 1939 |